Oct. 31, 1961 H. O. FEILBACH 3,006,421
LAWN EDGER
Filed Aug. 13, 1956 2 Sheets-Sheet 1
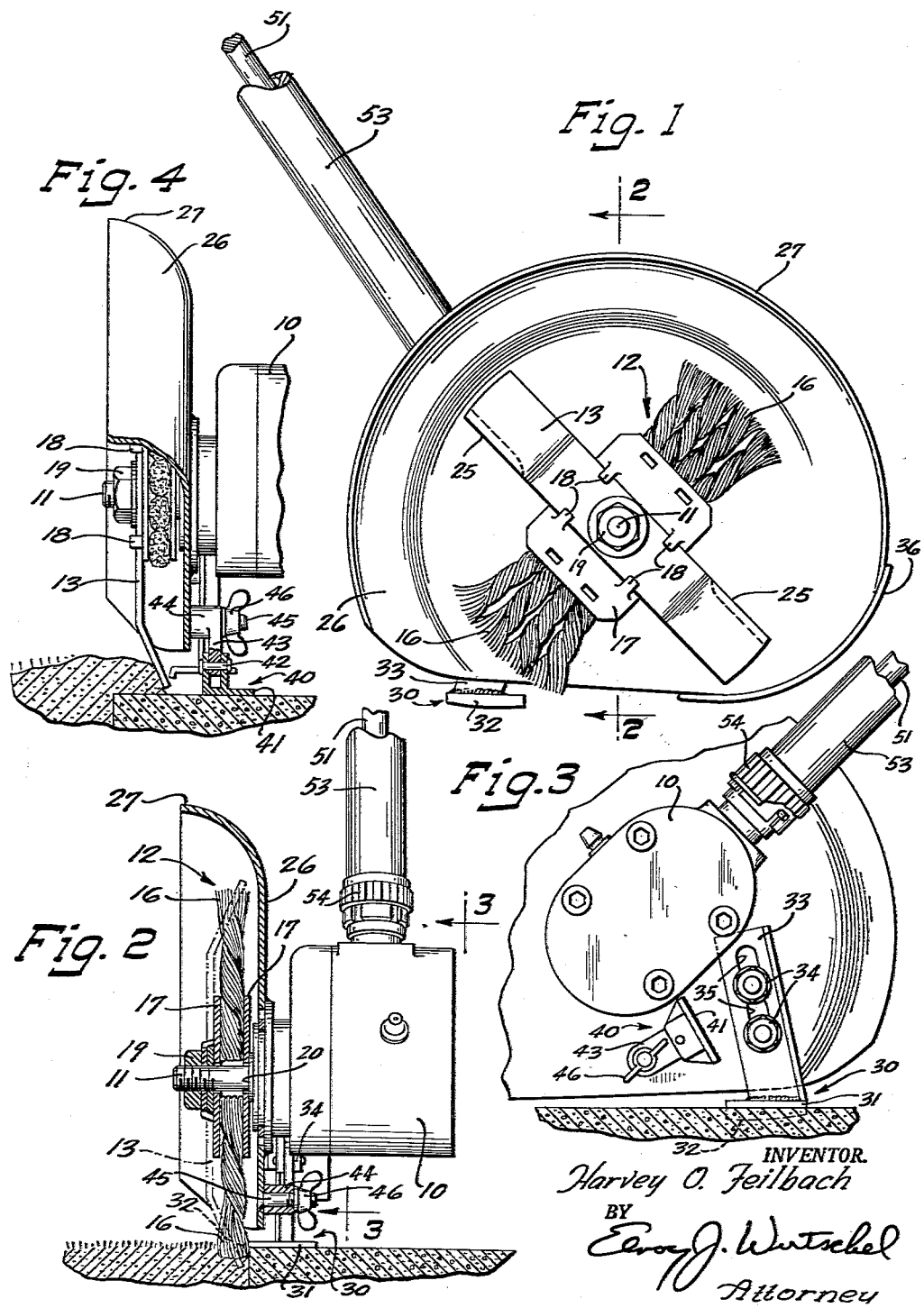
INVENTOR.
Harvey O. Feilbach
BY
Elroy J. Wirtschel
Attorney

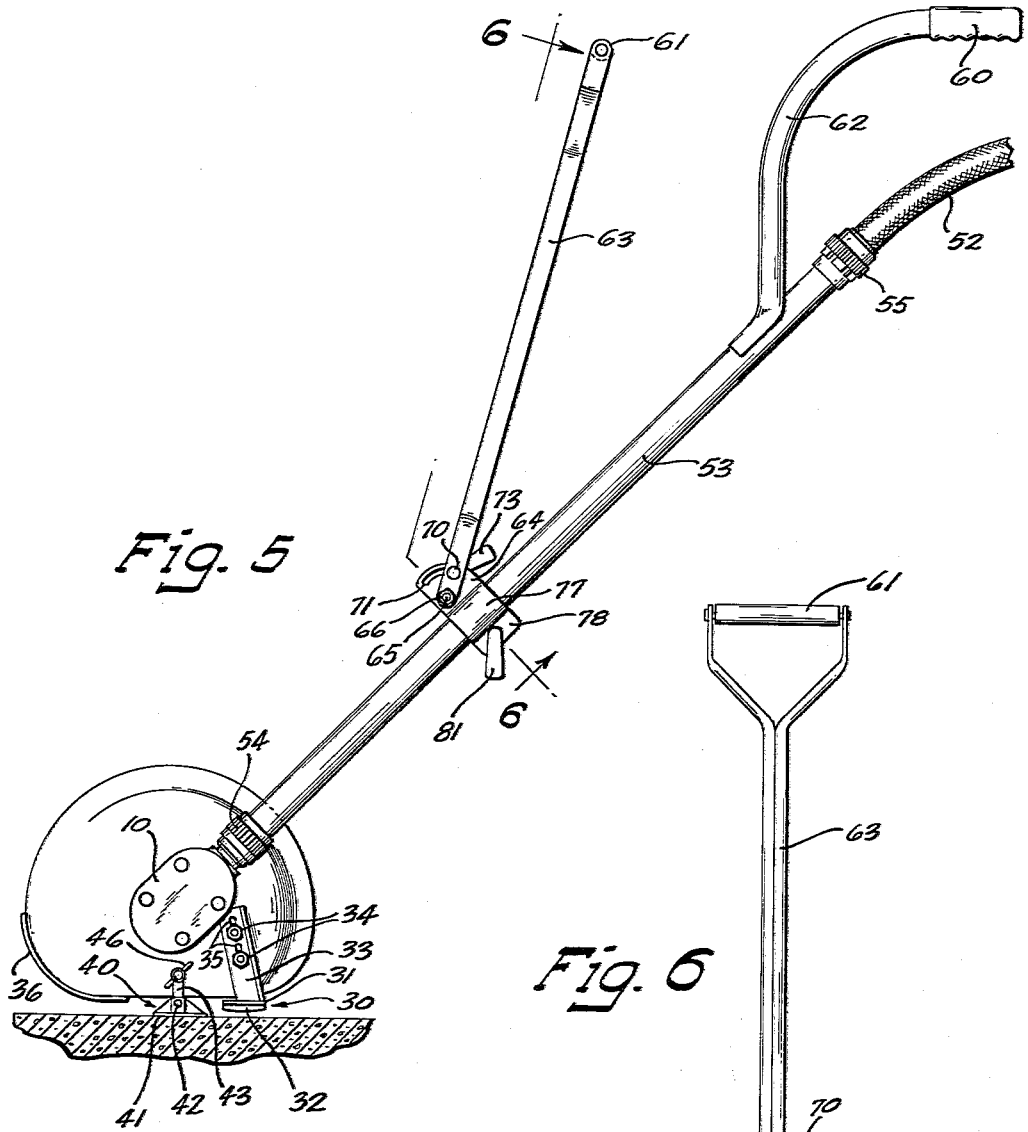

United States Patent Office 3,006,421
Patented Oct. 31, 1961

3,006,421
LAWN EDGER
Harvey O. Feilbach, Milwaukee, Wis., assignor to Francis J. Trecker, West Allis, Wis.
Filed Aug. 13, 1956, Ser. No. 603,685
8 Claims. (Cl. 172—15)

This invention relates generally to a lawn edger, and more particularly an improved lawn edger especially adapted to establish the edge of a lawn along sidewalks or similar structures.

It is a general object of the present invention to provide an improved power operated lawn edger for removing the grass and soil adjacent to the edge of a sidewalk or similar structure to sharply define the edge of the lawn along a line slightly spaced from the sidewalk so that it presents a neat appearance.

Another object of the present invention is to provide an improved lawn edger that will produce a well defined edge in a lawn with a minimum amount of effort and skill on the part of the operator.

Another object of the present invention is to provide an improved lawn edger having a cutting blade and brush operating together to sever the lawn and soil adjacent to a sidewalk or similar structure and expel it to establish a well defined edge in the lawn slightly spaced from and parallel to the sidewalk.

Another object is to provide a lawn edger with a selectively operable guide for establishing the edge of the lawn adjacent to a sidewalk and another selectively operable guide for removing soil and lawn that may accumulate on the surface of the sidewalk.

A further object is to provide a lawn edger that is extremely light in weight to render it readily maneuverable but which is capable of applying substantial power for performing its function.

A further object is to provide a lawn edger that will propel the grass and soil from the space directly adjacent to a sidewalk but will direct it away from the operator.

A further object is to provide an improved power operated lawn edger of simple and inexpensive but sturdy construction and efficient in operation.

According to this invention the improved lawn edger comprises a cutting blade and brush fixed to a rotatable shaft. The cutting blade and brush are in juxtaposition disposed approximately 90° relative to each other. The cutting blade operates to sever and break up the lawn and soil adjacent to the sidewalk while the brush functions in conjunction with the blade to expel the broken up soil and lawn from the area along the edge of the sidewalk to form a clean groove between the well defined edge of the lawn and the edge of the sidewalk to present a neat appearance. The brush and blade rotate within a shield which operates to direct the soil and grass that are being propelled by the brush and blade onto the lawn away from the sidewalk and operator. Two adjustable guides are provided for selective operation to guide the edger along the edge of a sidewalk or to support it above the surface of the walk for cleaning the soil and lawn that may have accumulated there beyond its edge. A suitable handle with two grips is attached to the operating mechanism to extend upwardly for the convenience of the operator in handling the edger as it is being employed to perform its function.

The foregoing and other objects of this invention, which will become more fully apparent from the following detailed description, may be achieved by the particular embodiment depicted in and described in connection with the accompanying drawings, in which:

FIGURE 1 is a view in left side elevation illustrating the improved lawn edger of the present invention with the upper portion of its handle broken away;

FIG. 2 is a view partly in front elevation and partly in vertical section taken along the plane represented by the line 2—2 in FIG. 1;

FIG. 3 is a fragmentary view in right side elevation depicting the mounting of the adjustable guides on the shield of the edger;

FIG. 4 is a fragmentary view in front elevation with parts broken away to illustrate the apparatus functioning to clean accumulated soil and grass from the top surface of a sidewalk;

FIG. 5 is a view of the lawn edger of the present invention in right side elevation with the surface guide in operating position to guide the edger for cleaning the surfaces of the sidewalk; and, FIG. 6 is a detail view taken along the plane represented by the line 6—6 in FIG. 5 to illustrate the adjustable grip of the handle.

Reference is now made more particularly to the drawings and specifically to FIGS. 1 and 2 which illustrate the operating mechanism of a lawn edger incorporating the features of the present invention. The illustrated embodiment comprises a gear case 10 for containing a set of bevel gears (not shown) and having an output shaft 11 that is journalled in the case 10 and protrudes therefrom. The brush 12 and cutting blade 13 are fixed on the protruding end of the output shaft 11 being disposed 90° relative to each other and in juxtaposition.

The brush 12 includes two sets of bristles 16 with each set extending in opposite directions. The bristles 16 are preferably formed of wire although other materials may be satisfactorily used for this purpose. The bristles 16 are bound together by a pair of plates 17 centrally disposed between the ends of the bristles, with one plate on each side of the bristles and fastened to each other to hold the bristles together. Four lips 18 are pressed out of one of the plates 17 to overlap the cutting blade 13 for the purpose of rigidly securing it to the brush 12 to prevent it from moving relative to the brush during its operation.

The outer end of the output shaft 11 is threaded for the purpose of receiving a nut 19 which may be tightened against the cutting blade 13 and brush 12 to force the rearmost plate 17 into tight engagement with a shoulder 20 formed at the inner portion of the output shaft 11 as best shown in FIG. 2. With this arrangement the cutting blade 13 and brush 12 are rigidly secured to the output shaft 11 to rotate with it and are prevented from rotating relative to each other.

The cutting blade 13 includes two cutting edges 25 formed at opposite ends of the blade and on opposite sides, along a portion of the blade which is bent inwardly for forming a groove between the edge of the lawn and the edge of the sidewalk. The two cutting portions of the cutting blade 13 upon which the cutting edges 25 are formed are inclined toward the brush 12 to extend into the plane of rotation of the brush as clearly shown in FIG. 2. With this arrangement, the brush 12 and cutting edges 25 rotate in the same plane for operation upon the lawn. When the output shaft 11 is rotated, the cutting blade 13 and the brush 12 rotate with it in a counterclockwise direction as viewed in FIG. 1. As these two members rotate, the cutting edges 25 sever the lawn and soil along a line parallel to and spaced slightly from the edge of the sidewalk and break up the soil. The brush 12 functions to further break up the soil and grass which has been initially broken up by the cutting blade 13, so that they are finely divided, and expels this dirt to form a clean groove between the edge of the lawn and the edge of the sidewalk. The brush 12 and cutting blade 13 are rotating in a direction to propel the dirt forwardly ahead of the operator.

In order to avoid propelling the dirt onto the sidewalk ahead of the operator, the brush 12 and cutting blade 13 are disposed within a shield 26 which has an arcuate rim 27 that extends outwardly, beyond the plane of the brush 12 and the cutting blade 13, to direct the dirt that is being propelled from the groove away from the sidewalk and onto the lawn. The rim 27 extends about a portion of the periphery of the shield 26, being omitted along the lower edge of the shield to provide clearance for the operation of the brush 12 and the cutting blade 13 on the lawn. As the finely divided dirt is expelled from the groove being formed at the edge of the lawn by the edger, it is thrown against the arcuate surface of the rim 27 which functions to direct it away from the sidewalk and onto the lawn where it is inconspicuous and eventually becomes absorbed by the soil.

The lawn edging operation is usually performed along a sidewalk or curb and it is essential that the edge of the lawn be established substantially parallel to the edge of the sidewalk for a neat appearance. To this end, an edging guide is provided which is generally identified in the drawings by the reference numeral 30. The edging guide 30 comprises a plate 31 having a downwardly extending lip 32 having a vertical guide surface that is disposed to engage the edge of the sidewalk while the plate 31 is resting upon its top surface to maintain the cutting blade 13 and brush 12 in a definite relationship with respect to the edge of the sidewalk and thereby cause these members to establish an edge in the lawn that is substantially parallel to the edge of the sidewalk.

The plate 31 and its associated lip 32 are secured to the end of a bracket 33 that is attached to the shield 26 by suitable bolts 34. The bracket 33 is provided with elongated openings 35 for receiving the bolts 34 to enable the edging guide 30 to be adjusted relative to the shield 26 for the purpose of varying the height at which the cutting blade 13 and the brush 12 will operate with respect to the surface of the sidewalk upon which the plate 31 is in engagement with. In operation, the edging guide 30 is adjusted to the desired height and the plate 31 is placed upon the top surface of the sidewalk with the lip 32 in engagement with the edge of the sidewalk and this relationship of the plate 31 and the lip 32 with the sidewalk is maintained while the lawn edger is moved forwardly to effect the edging operation.

Additional support for the mechanism during the edging operation is provided by a plate 36 that is disposed to engage the top surface of the sidewalk at the same time that the edging guide 30 is in engagement therewith. The plate 36 is attached to the shield 26 at its periphery and extends laterally thereof in a direction opposite to the direction in which the rim 27 extends. While the guide 30 is located at the rear portion of the shield 26 the plate 36 is attached to the forward portion of the shield 26 so that the two areas in contact with the top surface of the sidewalk are in spaced relationship to furnish a sturdy support for the mechanism on the sidewalk and thereby facilitate its operation.

It frequently occurs that soil from the lawn is washed over the edge of the sidewalk and onto its surface, and a growth of lawn or other vegetation develops in this soil that is resting upon the top surface of the sidewalk. When this occurs it is necessary to remove the soil from the surface of the sidewalk before an edge that is spaced from the sidewalk can be established in the lawn. The lawn edger of the present invention is especially adapted to remove this soil from the surface of the sidewalk by including a surface guide 40 that functions to maintain the brush 12 and cutting blade 13 at a fixed height with respect to the surface of the sidewalk while the mechanism is being moved along the surface of the sidewalk for removing the soil and vegetation that has accumulated there. If the edging guide 30 were used for guiding the unit along the top surface of a sidewalk its lip 32 would prevent the plate 31 from properly engaging the surface of the sidewalk and interfere with the sliding movement of the plate along the surface. The surface guide 40 is therefore provided for this purpose.

The surface guide 40 comprises a slide plate 41 which is pivotally supported on a pin 42 as clearly shown in FIG. 4. The pin 42 is carried by an arm 43 that extends radially from a hub 44 that is rotatably supported on a stud 45 which extends laterally from the shield 26. A wing nut 46 is threaded on the end of the stud 45 for the purpose of retaining the hub 44 thereon and locking it in a desired position relative to the shield 26. It will be noted that although the hub 44 and its associated arm 43 may be locked in position by tightening the wing nut 46, the slide plate 41 will remain free to move angularly a limited amount to accommodate the contour of the surface upon which it is sliding by reason of its pivotal connection to the arm 43 through the pin 42.

Furthermore, the pivotal connection of the slide plate 41 with the arm 43 enables the height of the slide plate 41 to be varied relative to the axis of the output shaft 11 for establishing the position of the cutting blade 13 and brush 12 with respect to the surface of the sidewalk by changing the angular position of the arm 43. When the arm 43 is in a vertical position as illustrated in FIG. 5, the slide plate 41 is in its lowermost position for raising the brush 12 and cutting blade 13 the maximum amount above the surface of the sidewalk. By changing the angular position of the arm 43 in either direction from the vertical position as shown in FIG. 5, the slide plate 41 will move upwardly with it, towards the axis of the output shaft 11, to change the height of the brush 12 and cutting blade 13 with respect to the surface of the sidewalk. The angular position of the arm 43 will not interfere with the operation of the slide plate 41 because the latter will assume a position parallel to the surface of the sidewalk by virtue of its pivotal connection with the arm 43 about the pin 42.

When the surface guide 40 is in its operating position as illustrated in FIG. 5, it raises the shield 26 and its associated edging guide 30 with it so that the latter is above the surface of the sidewalk. When it is desired to establish the edge of a lawn along the edge of a sidewalk, the surface guide 40 is moved to an inoperative position where it will not interfere with the functioning of the edging guide 30. This is accomplished by simply loosening the wing nut 46 and pivoting the arm 43 in either direction to move the slide plate 41 above the lower edge of the shield 26 as clearly shown in FIG. 3. After the arm 43 is thus pivoted into this upward position to locate the slide plate 41 above the lower edge of the shield 26, the wing nut 46 is tightened for the purpose of retaining the surface guide 40 in this inoperative position. The edging guide 30 may then be employed as previously described to perform its function of guiding the unit along the edge of a sidewalk for establishing the edge of a lawn parallel thereto.

In the illustrated embodiment the power for driving the brush 12 and the cutting blade 13 is obtained from an independent source (not shown) and transmitted therefrom through a flexible shaft 52 which is connected to rotate a drive shaft 51 that is journalled in a tubular handle 53. The handle 53 is provided with two quick acting couplings 54 and 55 for operably connecting its drive shaft 51 to the input shaft (not shown) of the gear case 10 and the flexible shaft 52 respectively. With this arrangement, the power is transmitted from the flexible shaft 52, through the drive shaft 51 that is journalled in the tubular handle 53 and the bevel gears (not shown) in gear case 10 to drive the output shaft 11 of the gear case 10 for rotating the brush 12 and cutting blade 13.

In the illustrated structure, a flexible shaft is shown for transmitting power from an independent source for driving the brush 12 and cutting blade 13. It is to be understood, however, that other means of driving the brush 12 and cutting blade 13 may be employed without detracting from the efficiency of the unit. For example, the gear case 10 could be eliminated in favor of an electric motor with its output shaft mounted in position to drive the brush 12 and cutter blade 13. With the latter arrangement, an electric power cord connected to a suitable source of electrical energy would be substituted for the flexible shaft 52 and it would extend through the tubular handle 53 to the terminals of the electric motor for transmitting electrical current to energize it.

The tubular handle 53 is of sufficient length to enable the operator to conveniently handle the apparatus. In order to facilitate the manipulation of the unit, the handle 53 is provided with two grips 60 and 61 which may be grasped by the operator. The grip 60 is fixed relative to the handle 53 and is mounted on the end of a curved arm 62 which is secured at its opposite end to the tubular handle 53.

The grip 61 is adjustable in two directions to suit the convenienec of the operator and to this end is mounted at the end of an arm 63. As best shown in FIG. 6, the opposite end of the arm 63 is bifurcated to straddle a split bracket 64. A bolt 65 extends through the bracket 64 and the bifurcated end of the arm 63 to support the arm 63 for pivotal movement to enable the grip 61 to be moved toward or away from the handle 53. The bolt 65 is retained in its operating position by a cooperating nut 66 which is threaded on the bolt but not tightened so that the arm 63 is free for pivotal movement relative to the handle 53.

A clamping screw 70 is provided for locking the arm 63 at the desired angle relative to the handle 53. The clamping screw 70 extends through the bifurcated end of the arm 63 and an arcuate slot 71 formed in the bracket 64, into threaded engagement with a nut 72 that is provided with a handle 73 to facilitate its manipulation. In order to lock the arm 63 and its associated grip 61 in the desired pivotal position, it is only necessary to grasp the handle 73 and turn it to tighten the nut 72 on the screw 70 to clamp the bifurcated end of the arm 63 to the bracket 64.

The grip 61 is also adjustable longitudinally along the handle 53 adjusting the position of the bracket 64 along the length of the handle 53. To this end, a semicylindrical portion is formed in each half of the split bracket 64 to form a cylindrical portion 77 when the bracket is assembled, and the cylindrical portion 77 embraces the periphery of the handle 53. The split bracket 64 includes a tongue 78 that depends from the cylindrical portion 77 and is split along with the bracket 64 so that each half of the tongue 78 is attached to one of the semicylindrical portions that form the cylindrical portion 77. The bracket 64 is locked in the desired longitudinal position along the handle 53 by applying pressure to the two halves of the tongue 78 to force them together and thereby draw the two halves of the cylindrical portion 77 tightly about the periphery of the handle 53. The necessary pressure is applied to the tongue 78 by means of a clamping screw 79 which extends through both halves of the tongue 78 into threaded engagement with a nut 80 that is provided with a handle 81 to facilitate its manipulation. With this arrangement it is only necessary to revolve the handle 81 to tighten it on the clamping screw 79 for the purpose of applying the required pressure to the halves of the tongue 78 for locking the bracket 64 on the handle 53.

It is apparent therefore that the grip 61 may be readily adjusted to a position which will suit the convenience of the operator by pivoting the arm 63 to establish the distance of the grip 61 from the handle 53, and its most suitable position along the length of the handle 53 may be established by adjusting the longitudinal position of the bracket relative to the handle.

From the foregoing detailed description of an explanation of the operation of the exemplifying lawn edger, herein set forth as a practical embodiment of the present invention, it will be apparent that there has been provided an improved lawn edger that is especially adapted to function efficiently for accurately establishing a neat edge in a lawn as well as to remove soil and vegetation that may have spread onto the surface of an adjacent sidewalk, and it will perform these functions without propelling dirt onto the sidewalk and with a minimum of effort on the part of the operator.

Although the illustrative embodiment of the invention has been described in considerable detail for the purpose of disclosing a practical operative structure whereby the invention may be practiced advantageously, it is to be understood that the particular apparatus described is intended to be illustrative only and that various novel characteristics of the invention may be incorporated in other structural forms without departing from the spirit and scope of the invention as defined in the subjoined claims.

The principles of this invention having now been fully explained in connection with the foregoing description, I hereby claim as my invention:

1. In an apparatus for establishing the edge of a lawn along a structure; a rotatable shaft; a source of power connected to rotate said shaft; a cutting blade secured to said shaft to rotate with it; a brush secured to said shaft to rotate with it contiguous to said cutting blade; a shield supported adjacent to said brush and cutting blade and formed to direct dirt propelled by said cutting blade and brush at an angle to the path of travel of the apparatus so that it may be discharged onto the lawn away from the structure; an edging guide adjustably mounted to support said shaft at a predetermined height and adapted to engage the structure along which the edge of the lawn is being established and to slide relative to the structure to guide said rotating cutting blade and brush along a path parallel to the edge of the structure to establish an edge in the lawn adjacent to the structure; a surface guide operable selectively and independently of said edging guide to support said shaft a predetermined distance above the surface of the structure for maintaining said rotating brush and cutting blade in position to operate upon soil and vegetation which may have accumulated upon the surface of the structure; an elongated handle connected to the apparatus; a grip fixed to said handle; a second grip adjustably mounted on said handle for movement toward and away from said handle and for movement longitudinally of said handle; and clamping means operable to clamp said second grip in a selected position; whereby the operator may grasp said grips for manipulating the apparatus in performing the lawn edging operation.

2. In an apparatus for establishing the edge of a lawn along a structure; a rotatable shaft; a source of power connected to rotate said shaft; an edging member secured to said shaft to rotate with it to operate upon the lawn for establishing an edge in the lawn; a shield supported adjacent to said edging member and formed to direct dirt propelled by said edging member at an angle to the path of travel of the apparatus; an edging guide mounted to support said shaft at a selected height and adapted to engage the edge of a structure and slide relative to it to guide said rotating edging member along a path parallel to the edge of the structure to establish an edge in the lawn to a predetermined depth adjacent to the structure; and a surface guide positionable to support said shaft a predetermined distance above the surface of the structure and slidable along the surface of the structure for operation independently of said edging guide to guide said edging member for operation upon soil and vegetation that may have accumulated upon the surface of the structure; whereby the apparatus will function alternatively to establish an edge in a lawn adjacent to a structure or to remove soil and vegetation that has accumulated on the surface of the structure.

3. In an apparatus for establishing the edge of a lawn along a structure; a rotatable shaft; a source of power connected to rotate said shaft; a cutting blade secured to said shaft to rotate with it; a brush secured to said shaft to rotate with it contiguous to said cutting blade; an edging guide mounted to support said shaft at a predetermined height and adapted to engage the edge of the structure and slide relative to it to guide said rotating cutting blade and brush along a path parallel to the edge of the structure to establish an edge in the lawn to a predetermined depth adjacent to the structure; and a surface guide operable independently of said edging guide and positionable to support said shaft a predetermined distance above the surface of the structure and slidable along the surface of the structure to guide said cutting blade and brush for operation upon soil and vegetation that may have accumulated upon the surface of the structure; whereby the apparatus will function selectively to establish an edge in a lawn adjacent to a structure or to remove the soil and vegetation that may have accumulated on the surface of the structure.

4. In an apparatus for establishing the edge of a lawn along a structure; a rotatable shaft; a source of power connected to rotate said shaft; a cutting blade secured to said shaft to rotate with it; a brush secured to said shaft to rotate with it contiguous to said cutting blade; a shield supported adjacent to said brush and cutting blade and formed to direct dirt propelled by said cutting blade and brush way from the structure and onto the lawn; an edging guide mounted to engage the structure along which the edge of the lawn is being established and slidable relative to the structure to guide said rotating cutting blade and brush along a path parallel to the edge of the structure to establish an edge in the lawn adjacent to the structure; and a surface guide selectively operable independently of said edging guide to support said shaft a predetermined distance above the surface of the structure for maintaining said rotating brush and cutting blade in position to operate upon soil and vegetation which may have accumulated upon the surface of the structure; whereby the apparatus will function to establish an edge in a lawn adjacent to a structure or to remove soil and vegetation that may have accumulated on the surface of the structure.

5. In an apparatus for establishing the edge of a lawn along a structure; a rotatable shaft; a source of power connected to rotate said shaft; a cutting blade secured to said shaft to rotate with it; a brush secured to said shaft to rotate with it, said brush being alternately disposed with and in the plane of rotation of said cutting blade so that the lawn will be alternately engaged by said cutting blade and said brush; a shield supported adjacent to said brush and cutting blade and formed to direct dirt propelled by said cutting blade and brush at an angle to the path of travel of the apparatus so that it may be discharged onto the lawn away from the structure; a bracket adjustably secured to the rearward portion of said shield; an edging plate mounted on the lower end of said bracket in a substantially horizontal plane for sliding engagement with the surface of the structure to establish the depth of the edging operation; a lip depending from said edging plate to engage the edge of the structure along which the edge of the lawn is being established and to slide relative to the structure to guide said rotating cutting blade and brush along a path parallel to the edge of the structure to establish an edge in the lawn adjacent to the structure; a support plate secured to the forward portion of said shield in position to slidably engage the surface of the structure for operation in conjunction with said edging plate to provide a two point support for the apparatus during an edging operation; an arm pivotably supported at one end by said shield intermediate said edging plate and said support plate; locking means operably connected to lock said arm in a selected pivotal position; and a slide plate pivotably supported at the end of said arm opposite the end of said arm which is pivotably connected to said shield; whereby said arm may be pivoted downwardly to locate its associated slide plate in an operative position for guiding the apparatus along the surface of the structure remote from its edge for removal of soil therefrom, said slide plate functioning when in its operative position to render said edging plate and its associated lip inoperative by raising them above the surface of the structure so that they will not interfere with the engagement of said slide plate with the surface being cleaned.

6. In an apparatus for establishing the edge of a lawn along a structure; a rotatable shaft; a source of power connected to rotate said shaft; a cutting blade secured to said shaft to rotate with it; a brush secured to said shaft to rotate with it, said brush being alternately disposed with and in the plane of rotation of said cutting blade so that the lawn will be alternately engaged by said cutting blade and said brush; a shield supported adjacent to said cutting blade and brush; an edging guide adjustably carried by said shield and adapted to slidably engage the edge as well as the top surface of the structure along which the edge of the lawn is being established to determine the depth of the edging operation and guide said rotating cutting blade and brush along a path parallel to the edge of the structure; a support plate secured to said shield in spaced relationship to said edging guide to slidably engage the surface of the structure for operation in conjunction with said edging plate to provide a second support for the apparatus during an edging operation; a surface guide pivotably supported by said shield intermediate said edging plate and said support plate for selective pivotal movement to an inoperative position and an operative position wherein it slidably engages the surface of the structure for guiding the apparatus along the surface of the structure remote from its edge for the removal of soil therefrom; and locking means operably connected to lock said surface guide in a selected pivotal position; whereby said surface guide may be pivoted downwardly to its operative position for guiding the apparatus along the surface of the structure for removal of soil therefrom and at the same time rendering said edging guide inoperative by raising it above the surface of the structure so that it will not interfere with the engagement of said surface guide with the surface being cleaned.

7. In a device for edging a lawn along structure having an approximately upright side surface facing the lawn and an approximately horizontal top surface adjoining the side surface, a frame movable along the structure, a guide mounted on said frame having a substantial vertical guide surface for disposition against the vertical portion of said upright side surface, a shaft journalled for rotation on said frame above said surfaces, a blade mounted on said shaft and having a revolving cutting edge to partially cut a groove in the lawn adjacent said upright surface during advancing movement of said frame along the structure, the path of said cutting edge being disposed in spaced relation to said vertical guide surface, a flexible brush also mounted upon said shaft and revolvable in a plane disposed between the path of said cutting blade and said vertical guide surface to complete and to remove cuttings from the edging groove partially formed by said blade edge during said movement of the frame.

8. In a device for edging a lawn along structure having an approximately upright side surface facing the lawn and an approximately horizontal top surface adjoining the side surface, a frame movable along the structure, a guide mounted on said frame having a substantial vertical guide surface for disposition against the vertical portion of said upright side surface, a shaft journalled for rotation on said frame above said surfaces, a blade mounted on said shaft and having a revolving cutting edge to partially cut a groove in the lawn adjacent said upright surface during advancing movement of said frame along the structure, the path of said cutting edge being disposed in spaced relation to said vertical guide surface, and a flexible brush also mounted upon said shaft and revolvable in a plane disposed between the path of said cutting blade and said vertical guide surface and in contact with said structure side surface to complete and to remove cuttings from the edging groove partially formed by said blade edge during said movement of the frame, said guide having a horizontal portion adapted to engage the top surface of said structure for controlling the depth of cut of said edger.

References Cited in the file of this patent

UNITED STATES PATENTS

| | | |
|---|---|---|
| 1,083,054 | Brown | Dec. 30, 1913 |
| 2,062,820 | Pierce | Dec. 1, 1936 |
| 2,139,353 | Bruder | Dec. 6, 1938 |
| 2,223,035 | Haas et al. | Nov. 26, 1940 |
| 2,612,741 | McKay | Oct. 7, 1952 |
| 2,658,290 | Pierce | Nov. 10, 1953 |
| 2,706,941 | Swanson | Apr. 26, 1955 |
| 2,707,361 | Thomas | May 3, 1955 |
| 2,718,838 | Schumacher | Sept. 27, 1955 |
| 2,775,856 | Hoch | Jan. 1, 1957 |
| 2,796,715 | Meltzer | June 25, 1957 |
| 2,826,889 | Menge | Mar. 18, 1958 |

FOREIGN PATENTS

| | | |
|---|---|---|
| 238,239 | Great Britain | Feb. 25, 1926 |